(12) United States Patent
Dubnicki et al.

(10) Patent No.: US 7,844,581 B2
(45) Date of Patent: Nov. 30, 2010

(54) METHODS AND SYSTEMS FOR DATA MANAGEMENT USING MULTIPLE SELECTION CRITERIA

(75) Inventors: Cezary Dubnicki, Monmouth Junction, NJ (US); Krzysztof Lichota, Warszawa (PL); Erik Kruus, Hillsborough, NJ (US); Cristian Ungureanu, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 312 days.

(21) Appl. No.: 11/566,122

(22) Filed: Dec. 1, 2006

(65) Prior Publication Data

US 2008/0133446 A1 Jun. 5, 2008

(51) Int. Cl.
*G06F 7/00* (2006.01)
(52) U.S. Cl. .................. 707/693; 707/698; 707/821
(58) Field of Classification Search ............ 707/693, 707/698, 821, 999.1
See application file for complete search history.

(56) References Cited

U.S. PATENT DOCUMENTS

| | | | |
|---|---|---|---|
| 6,263,336 B1 * | 7/2001 | Tanaka | 707/6 |
| 6,658,423 B1 | 12/2003 | Pugh et al. | 707/102 |
| 6,810,398 B2 * | 10/2004 | Moulton | 707/6 |
| 7,103,602 B2 | 9/2006 | Black et al. | 707/101 |
| 7,797,323 B1 * | 9/2010 | Eshghi et al. | 707/737 |
| 2005/0060643 A1 * | 3/2005 | Glass et al. | 715/501.1 |
| 2005/0080823 A1 * | 4/2005 | Collins | 707/200 |
| 2005/0091234 A1 * | 4/2005 | Hsu et al. | 707/100 |
| 2005/0131939 A1 * | 6/2005 | Douglis et al. | 707/103 |
| 2006/0047855 A1 * | 3/2006 | Gurevich et al. | 709/247 |
| 2006/0059171 A1 * | 3/2006 | Borthakur et al. | 707/100 |
| 2006/0112148 A1 | 5/2006 | Jennings, III et al. | 707/201 |
| 2006/0112264 A1 | 5/2006 | Agarwal | 713/150 |
| 2006/0235895 A1 * | 10/2006 | Rodriguez et al. | 707/200 |
| 2007/0124415 A1 * | 5/2007 | Lev-Ran et al. | 709/217 |
| 2007/0239947 A1 * | 10/2007 | Li et al. | 711/154 |
| 2008/0005141 A1 * | 1/2008 | Zheng et al. | 707/101 |

(Continued)

OTHER PUBLICATIONS

Denehy et al., (IBM Research Report—Duplicate Management for Reference Data, IBM, 2003, 15 pages, accessed online at <http://domino.research.ibm.com/library/cyberdig.nsf/papers/9ADD5F942230D74585256E3500578D88/$File/rj10305.pdf> on Apr. 30, 2010. (Provided by Applicant).*

(Continued)

*Primary Examiner*—Charles Rones
*Assistant Examiner*—Phuong-Thao Cao
(74) *Attorney, Agent, or Firm*—Joseph Kolodka; James Bitetto

(57) ABSTRACT

Systems and methods for data management and data processing are provided. Embodiments may include systems and methods relating to fast data selection with reasonably high quality results, and may include a faster data selection function and a slower data selection function. Various embodiments may include systems and methods relating to data hashing and/or data redundancy identification and elimination for a data set or a string of data. Embodiments may include a first selection function is used to pre-select boundary points or data blocks/windows from a data set or data stream and a second selection function is used to refine the boundary points or data blocks/windows. The second selection function may be better at determining the best places for boundary points or data blocks/windows in the data set or data stream. In various embodiments, data may be processed by a first faster hash function and slower more discriminating second hash function.

26 Claims, 9 Drawing Sheets

U.S. PATENT DOCUMENTS

| | | | |
|---|---|---|---|
| 2008/0013830 A1* | 1/2008 | Patterson et al. | 382/173 |
| 2008/0025298 A1* | 1/2008 | Lev-Ran et al. | 370/389 |
| 2008/0034021 A1* | 2/2008 | De Spiegeleer | 707/204 |
| 2009/0228685 A1* | 9/2009 | Wei et al. | 712/31 |

OTHER PUBLICATIONS

Bobbarjung et al., "Improving Duplicate Eliminating in Storage Systems", ACM Transactions on Storage, vol. V, No. N, Jul. 2006, 23 pages, accessed online at <http://www.cs.purdue.edu/homes/suresh/papers/acm-storage.pdf> on Apr. 30, 2010.*

S. Annapureddy, M. Freedman, and D. Maziéres, "Shark: Scaling File Servers via Cooperative Caching" in NSDI '05 Paper [NSDI '05 Technical Program], (2005), pp. 129-142, http://www.usenix.org/events/nsdi05/tech/full_papers/annapureddy/annapureddy.pdf.

J. Barreto and P. Ferreira, "A Replicated File System for Resource Constrained Mobile Devices" in Proceedings of IADIS International Conference on Applied Computing, (2004), pp. 1-9.

A. Broder, "Some Application of Rabin's fingerprinting method" in R. Capocelli, A. De Santis and U. Vaccaro (eds), Sequences II: Methods in Communications, Security, and Computer Science, (1993), pp. 1-10 (pp. 143-152 in book).

A.Chowdhury, O. Frieder, D. Grossman, and M. C. McCabe, "Collection Statistics for Fast Duplicate Document Detection" in ACM Trans. Inf. Syst. 20, (2002), ISSN 1046-8188, pp. 171-191 http://www.ir.iit.edu/publications/downloads/p171-chowdhury.pdf.

T. Denehy and W. Hsu, "Duplicate Management for Reference Data", Technical report RJ 10305, IBM Research (2003), pp. 1-14 http://domino.watson.ibm.com/library/cyberdig.nsf/papers/9ADD5F942230D74585256E3500578D88/%24File/rj10305.pdf.

F. Douglis and A. Iyengar, "Application-Specific Delta-encoding via resemblance Detection", in Proceedings of the USENIX Annual Technical Conference (2003), pp. 1-23.

K. Eshghi and H. K. Tang, "A Framework for Analyzing and Improving Content-Based Chunking Algorithms", Technical report HPL-2005-30R1, HP Laboratories (2005), pp. 1-10. http://www.hpl.hp.com/techreports/2005/HPL-2005-30R1.html.

G. Forman, K. Eshghi, and S. Chiocchetti, "Finding Similar Files in Large Document Repositories" in KDD '05: Proceeding of the eleventh ACM SIGKDD international conference on Knowledge discovery in data mining, ACM Press, New York, NY, USA, (2005), pp. 394-400.

V. Henson and R. Henderson, "Guidelines for Using Compare-by-hash", (2005), pp. 1-14.

N. Jain, M. Dahlin, and R. Tewari, "Taper: Tiered Approach for Eliminating Redundancy in Replica Synchronization", Tech. Rep., Technical Report TR-05-42, Dept. of Comp. Sc., Univ. of Texas at Austin (2005), pp. 1-14, http://www.cs.utexas.edu/department/research/pubs.html.

R. Jain, "A Comparison of Hashing Schemes for Address Lookup in Computer Networks", IEEE Transactions on Communications 40, 1570 (1992), pp. 1-5, http://citeseer.ist.psu.edu/jain92combarison.html.

P. Koopman, "32-Bit Cyclic Redundancy Codes for Internet Applications", (2002), pp. 1-10.

P. Kulkarni, F. Douglis, J. LaVoie, and J. Tracey, "Redundancy Elimination Within Large Collections of Files" in Proceedings of the USENIX Annual Technical Conference (2004), pp. 1-14 http://scholar.google.com/url?sa=U&q=http://www.usenix.org/event/usenix04/tech/qeneral/full_papers/kulkarni/kulkarni_html/.

P. L'Ecuyer, Tables of Linear Congruential Generators of Different Sizes and Good Lattice Structure, in Math. Comput. 68, 249 (1999), ISSN 0025-5718, pp. 249-260 http://portal.acm.org/citation.cfm?id=307102&dl=acm&coll=&CFID=15151515&CFTOKEN=6184618#.

H. Lufei, W. Shi, and L. Zamorano, "On the Effects of Bandwidth Reduction Techniques in Distributed Applications", Proceedings of International Conference on Embedded and Ubiquitous Computing (EUC'04) (2004), pp. 1-10.

A. Muthitacharoen, B. Chen and D. Mazieres, "A Low-bandwidth Network File System", (2001), pp. 174-187.

C. Policroniades and I. Pratt, "Alternatives for Detecting Redundancy in Storage Systems Data", in USENIX_04: Proceedings of the USENIX Annual Technical Conference (2004), pp. 1-14 http://www.usenix.org/events/usenix04/tech/general/full_papers/policroniades/policroniades.html/.

D. R. K. Ports, A. T. Clements, and E. D. Demaine, "PersiFS: A Versioned File System with an Efficient Representation", in SOSP '05: Proceedings of the twentieth ACM symposium on Operating systems principles, ACM Press, New York, NY, USA, (2005), pp. 1-2.

M. Rabin, "Fingerprinting by Random Polynomials" Technical report TR-15-81, Harvard University (2003), pp. 1-12.

S. Schleimer, D. S. Wilkerson, and A. Aiken, "Winnowing: Local Algorithms for Document Fingerprinting", in SIGMOD '03: Proceedings of the 2003 ACM SIGMOD international conference on Management of data, ACM Press, New York, NY, USA, (2003), ISBN1-58113-634-X, pp. 1-10 http://citeseer.ist.psu.edu/schleimer03winnowing.html.

A. Spiridonov, S. Thaker, and S. Patwardhan, "Sharing and Bandwidth Consumption in the Low Bandwidth File System" in Tech. Rep., Department of Computer Science, University of Texas at Austin (2005), pp. 1-20 http://www.cs.utexas.edu/users/sahilt/research/LBFS.pdf.

J. Stone and M. Greenwald, "Performance of Checksums and CRCs over Real Data", (1998), pp. 1-19.

J. Stone, R. Stewart and D. Otis, "Stream Control Transmission Protocol (SCTP) Checksum Change", RFC 3309, The Internet Society Sep. 2002, pp. 1-17 http://www.faqs.org/ftp/rfc/pdf/rfc3309.txt.pdf.

T. Suel, P. Noel, and D. Trendafilov, "Improved File Synchronization Techniques for Maintaining Large Replicated Collections over Slow Networks" in ICDE '04: Proceedings of the 20th International Conference on Data Engineering, IEEE Computer Society, Washington, DC, USA, (2004), pp. 1-12.

A. Tridgell, "Efficient Algorithms for Sorting and Synchronization", Ph.D. Thesis, Australian National University, (Feb. 1999), pp. 1-115, http://citeseer.ist.psu.edu/tridgell99efficient.html.

A. Tridgell and P. MacKerras, "Technical report TRCS-96-05—The Rsync Algorithm", Australian National University, Department of Computer Science, FEIT, ANU (1996), pp. 1-6 http://eprints.anu.edu.au/archive/00001600/.

L. You and C. Karamanolis, "Evaluation of Efficient Archival Storage Techniques", in Proceedings of $21^{st}$ IEEE/NASA Goddard MSS (2004), pp. 1-6 http://citeseer.ist.psu.edu/697193.html.

L. You, K. T. Pollack, and D. D. E. Long, "Deep Store: An Archival Storage System Architecture" in ICDE '05: Proceedings of the 21st International Conference on Data Engineering, IEEE Computer Society, Washington, DC, USA, (2005), pp. 1-12.

* cited by examiner

METHODS AND SYSTEMS FOR DATA MANAGEMENT USING MULTIPLE SELECTION CRITERIA

This patent application is related to U.S. patent application Ser. No. 11/566,139, titled METHODS AND SYSTEMS FOR QUICK AND EFFICIENT DATA MANAGEMENT AND/OR PROCESSING to Cezary Dubnicki, Erik Kruus, and Cristian Ungureanu, also filed on Dec. 1, 2006, which is hereby incorporated herein by reference for all purposes.

This disclosure may contain information subject to copyright protection, for example, the various exemplary C++ codes and pseudocodes presented herein. The copyright owner has no objection to the facsimile reproduction by anyone of the patent disclosure or the patent as it appears in the U.S. Patent and Trademark Office files or records, but otherwise reserves all copyright rights whatsoever.

BACKGROUND

1. Field of the Invention

The present invention relates to the field of data processing and data management and, more specifically, to methods and systems related to quick data processing for applications such as data hashing and/or data redundancy elimination.

2. Description of Related Art

Every day more and more information is created throughout the world and the amount of information being retained and transmitted continues to compound at alarming rates, raising serious concerns about data processing and management. Much of this information is created, processed, maintained, transmitted, and stored electronically. The mere magnitude of trying to manage all this data and related data streams and storage is staggering. As a result, a number of systems and methods have been developed to process data more quickly and to store and transmit less data by eliminating as much duplicate data as possible. For example, various systems and methods have been developed to help reduce the need to store, transmit, etc., duplicate data from the various electronic devices such as computers, computer networks (e.g., intranets and the Internet), mobile devices such as telephones and PDA's, hardware storage devices, etc. Further, there is a need to encrypt data using cryptography, particularly during e.g., data transmission. For example, systems and methods have been developed that provide for strong (i.e. cryptographic) hashing, and such methods may be incorporated quite naturally within applications that use data hashing to accomplish data redundancy elimination over insecure communication channels.

In various electronic data management methods and systems, a number of methodologies have been developed to hash data and/or to eliminate redundant data from, for example, data storage and data transmission. These techniques include various data compression, data hashing, and cryptography methodologies. Some exemplary techniques are disclosed in various articles including Philip Koopman, 32-Bit Cyclic Redundancy Codes for Internet Applications, Proceedings of the 2002 Conference on Dependable Systems and Networks, 2002; Jonathan Stone and Michael Greenwald, Performance of Checksums and CRCs over Real Data, IEEE/ACM Transactions on Networking, 1998; Val Henson and Richard Henderson, An Analysis of Compare-by-Hash, Proceedings of the Ninth Workshop on Hot Topics in Operating Systems, Lihue, Hawaii, May 2003, pp. 13-18; and Raj Jain, A Comparison of Hashing Schemes for Address Lookup in Computer Networks, IEEE Transactions on Communications, 1992. There are also a number of U.S. patents and patent publications that disclosed various exemplary techniques, including U.S. Patent Pub. Nos. 2005/0131939, 2006/0047855, and 2006/0112148 and U.S. Pat. Nos. 7,103,602, and 6,810,398.

However, the known techniques lack certain useful capabilities. Typically the better performing selection techniques (e.g., high data redundancy elimination) use too much processing time (take too long) and very fast data selection techniques may lack the desired degree of data elimination. For example, there are a number of hashing function approaches, including whole file hashing, fixed size data block hashing, and content-defined data chunk hashing. However, none of these techniques are reasonably fast (using only a amount of computation time) and have the ability to identify most of the data redundancies in a data set (e.g., have high data redundancy elimination).

Therefore, there is a need for a data selection technique that has reasonable performance and is fast. For example, a hashing and/or data redundancy identification and elimination system and method is needed that can quickly perform data hashing and/or data redundancy identification and elimination while still identifying most of the redundant data in a data set. There is also a need for systems and methods that more quickly determine appropriate break points or boundaries for determining data blocks or chunks in a content defined hash function.

SUMMARY

The present invention is directed generally to providing systems and methods for data management and data processing. For example, embodiments may include systems and methods relating to fast data selection with better performing selection results (e.g., high data redundancy elimination), and may include a faster data selection process and a slower data selection process. Further, exemplary systems and methods relating to a data hashing and/or data redundancy identification and elimination for a data set or a string of data are provided. The present invention may be more robust and may provide systems and methods which combine some of the speed of a fast hash with the more robust performance characteristics of a hash that determines a more appropriate set of break points or boundaries. The invention may be a computer implemented invention that includes software and hardware for improving data processing speed without notably reducing the quality of the data processing results.

In various embodiments of the present invention, for example, systems and methods are provided which may include a first selection function used to pre-select boundary points or data blocks/windows from a data set or data stream and may include a second selection function that may refine the boundary points or data blocks/windows from a data set or data stream. The first selection function may be faster to compute (e.g., take less processing time to roll, that is, produce a hash value for a subsequent data block/window from said data set or data stream) than the second selection function. The second selection function may be better at determining appropriate places for boundary points or data blocks/windows in the data set or data stream. The second selection function may be, but need not be, rollable. One exemplary first selection function may be a boxcar sum based function using, for example, moving windows. This is a particularly fast data selection process. One exemplary second selection function may be a Rabin fingerprint function. This first selection function is particularly fast and this second selection function has particularly good bit-randomizing characteristics. In various embodiments the first selection function and the second selection function may be used to generate a plurality of content-defined boundary points, block break points or chunk points for determining at what point a data set or data stream should be segregated into various data blocks, chunks, or windows. In various embodiments, the content defined boundaries may be used for determining the data block, chunk, or window sizes to which a hash function may be applied and a resulting hash value may be produced. In various embodiments, the resulting hash value may be compared to one or more stored hash values to determine if the data block, chunk, or window is entirely duplicate data or whether the new hash value should be stored as a unique data block, chunk, or window.

In various embodiments, a content-defined technique for data hashing may be provided. The content-defined technique may include a processing system having a faster hash function module (e.g., taking less processing time because there are few calculations) and a slower hash function module (e.g., taking more processing time because there are more calculations). The faster hash function module may receive data from, for example, a data stream, and may pre-select one or more data boundary, break, block, or chunk points at which the data stream could be broken into distinct blocks or chunks of data. The faster hash function may be somewhat lower performance when determining the best data boundary, break, block, or chunk points. The faster hash function may be, for example, a boxcar sum function that uses, for example, a rolling or moving window. The slower hash function module may perform hashing on only those data blocks or chunks that have been pre-selected by the faster hash function. The slower hash function module may be better at determining the best data boundary, break, block, or chunking points for achieving a particular objective (e.g., identifying more redundancies). The slower hash function may be, for example, a Rabin fingerprint function, a, SHA-1 hash, a CRC32c hash, etc., and may be rolling or non-rolling.

Still further aspects included for various embodiments will be apparent to one skilled in the art based on the study of the following disclosure and the accompanying drawings thereto.

BRIEF DESCRIPTION OF THE DRAWINGS

The utility, objects, features and advantages of the invention will be readily appreciated and understood from consideration of the following detailed description of the embodiments of this invention, when taken with the accompanying drawings, in which same numbered elements are identical and.

DETAILED DESCRIPTION

Figure 1:
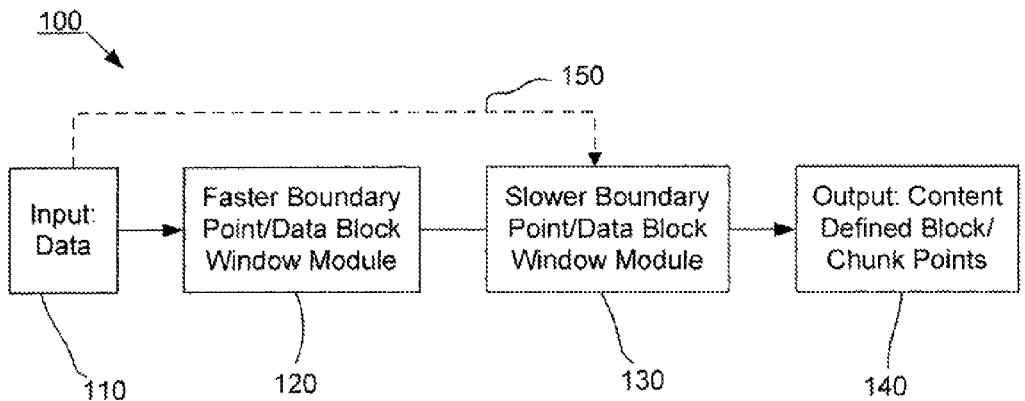
FIG. 1 is an exemplary data management or processing system using multi-mode data boundary point determination, according to at least one embodiment.

The present invention is directed generally to systems and methods for data management and data processing. Various embodiments may include systems and methods relating to a multi-mode data selection techniques. More specifically, various embodiments may include systems and methods relating to fast data selection with reasonably high quality results, and may include a faster data selection process and a slower data selection process. In various embodiments of the present invention, for example, systems and methods are provided which may include a first selection function used to pre-select boundary points or data blocks/windows from a data set or data stream and may include a second selection function that may refine the boundary points or data blocks/windows from a data set or data stream. The first selection function may be faster to compute (e.g., take less processing time) than the second selection function. The second selection function may be better at determining the best places for boundary points or data blocks/windows in the data set or data stream. One exemplary first selection function may be a boxcar sum based function using, for example, moving windows. This is a particularly fast data selection process. One exemplary second selection function may be a Rabin fingerprint function that may be rolling or non-rolling. Other selection functions have the faster/slower characteristics are equally applicable.

The invention may be a computer implemented invention that includes software and hardware for improving data processing speed without notably reducing the quality of the data processing results. In at least one embodiment, the system(s) and method(s) provided herein may be implemented using a computing device, and may be operational on one or more computer(s) within a network. Details of exemplary computing device(s) and network(s) are described in some detail in, FIG. 8 and FIG. 9. Prior reference to those examples may prove helpful in developing a better appreciation for various details of the invention.

In any case, for ease of understanding the present invention will be explained in more detail for use with hashing functions and/or data redundancy identification and/or data duplication elimination. However, one skilled in the art would appreciate that the present invention may be applicable to other data management and processing systems and methods including computers with a string of data to process or store, wireless communications that have data to transmit, Internet and Intranet applications, data encryption techniques, etc. In particular, the exemplary embodiments used herein to explain the present invention relate primarily to data hashing and data duplication elimination.

In data hashing and/or data redundancy identification and/or elimination embodiments, the present invention may include a faster hashing function and a slower hashing function. The fast hashing function may be for chunk, block or hash point pre-selection. The slower hashing function may be applied to determine which of the pre-selected chunk, block or hash points are better at identifying the most data duplication. Hashing functions for a data set or a string of data may be used to identify identical sections of data in large amounts of data. There are three general techniques for hashing: whole file content hashing, fixed size block hashing, and content-defined hashing. Whole file content hashing operates to create a hash value or check sum for entire files of data (e.g., a complete text or image file). Fixed size data block hashing may operate to create hash values or check sums for predetermined fixed size portions (e.g., 1000 bits) of various data files. Content-defined data block hashing may operate to create hash values or check sums based on variable size data blocks whose size is determined by a selected data content standard (e.g., break the data into a data chunk after X numbers of consecutive 1's or 0's are found in the data).

In the next few paragraphs, the speed of the SHA-1 may be almost the same in all three cases; for whole-file, fixed-size, and variable-size chunking. In each case, every input byte is in a unique chunk, and every such chunk must have the SHA-1 evaluated. However, one of the main things that may differ between whole-file, fixed-size, variable-size chunking is the number of such SHA-1 calculations. Nevertheless, for the SHA-1 evaluations, the total processing time (e.g., CPU time) will be almost the same, since the bulk of the processing time will mostly be in the SHA-1 calculation itself, and not in overhead related to storing one or several SHA-1 hash values.

In the case of whole file hashing, hashing may be performed by applying a hashing function to all the data of entire files. For example, a SHA-1 hashing function might be used and applied to an entire data file. The SHA-1 hashing function is computationally complex and may be slow relative to some other hashing functions. Regardless, in this case, for purposes of identifying and eliminating duplication, the least amount of data duplication is found and eliminated because when a single bit of data changes in a file, the resulting hash value will be different than previously saved and the full amount of data associated with the revised file will need to be transmitted or saved (e.g., when one letter in a text file is changed, the entire data representation of the text file and it's hash value will change so that it will not be a duplicate of a previous version of the same text file). On the other hand the hashing is quick because the hashing function need only be operated once for an entire file of data.

As noted above, a fixed size data block hashing function performs hashing on portions or blocks of the entire data found in a whole file (e.g., a single text file may be broken up into 10 same sized data blocks of 10K bits), and data blocks may be set at a non-overlapping fixed size. Once again, a SHA-1 hashing function might be applied to each of a fixed size set of blocks (e.g., 10K bits) that make up a whole file (e.g., 100K bits). In this case, more duplication may be found because the block of data hashed each time is smaller, and a single bit change somewhere in a whole file will only result in a change in one of the multiple blocks that make up a whole file (e.g., 9 of the 10 10K bit blocks will be duplicates). However, a single byte insertion may hinder duplicate detection for a large number of blocks (e.g., the blocks following the block containing the first insertion may be rendered non-duplicate). The smaller the block, the better redundancy detection, but a slightly slower process because the hashing function, for example SHA-1, must be run more times for the same amount of data found in the whole data file.

Finally, using the content defined data chunk hashing, hashing may be performed by applying a fairly slow and somewhat better performance (e.g., more accurate and discriminating calculation) to identify and generate a value for various chunks of data that are defined by their content. In this case, both localized insertion and localized replacement modifications may result in changes to a single content-defined chunk, thereby increasing the amount of duplication found when compared to fixed-size chunking. One such hashing function may include a combination of Rabin fingerprinting and SHA-1 hashing function. The Rabin fingerprinting may be applied multiple times for overlapping data windows (e.g., sliding window) of the data in the data file to determine where in the data file the chunk boundaries should be set, based on a predetermined boundary point criteria (e.g., the value of the function equals a predetermined number of bits or bytes ending in X number of 0's or 1's), then the SHA-1 hashing function may be applied to each of the determined data blocks (whose size varies based on the underlying data being analyzed). Again, each byte of input may enter into some SHA-1 hash calculation, as noted before. However, the Rabin fingerprinting presents an additional calculation burden (e.g. processing time) when compared to fixed size chunking. Although this approach is very good at identifying many more data redundancies, both of these functions can be time consuming and in combination make hashing and/or data redundancy identification and elimination very time consuming. In fact, the Rabin fingerprinting function may be particularly time consuming for identifying where in particular the various data block cuts or hash points should be in attempting to optimize the redundancy data identification and/or data elimination.

For the purposes of chunking, one means to achieve the desired degree of data elimination is to employ a selection function that produces chunks from real-world data with a content-defined, deterministic procedure in a manner that attains a chunk size distribution which matches closely the distribution expected given random data input. One way to accomplish this is to employ a hash function followed by a selection criterion with known probabilities of occurring. Typically, a single hash function is selected that has an excellent ability to "scramble" the bits within any data window. In this fashion, the output value exhibits little correlation with the actual data bits within the input window. With such a bit-randomizing hash value, H, simple selection criterion that have been used include, for example, insisting that a certain number of bits be equal to a predetermined value, or requiring that the value of $H^{\wedge}(H-1)$>threshold, H>threshold, or H and mask==value. Coupling a bit-randomizing hash with a selection procedure criterion may yield a selection function that selects a "random-looking" subset of input windows. The common hope is that such selection functions have excellent chances of producing a random-like chunk size distribution when presented with real-life (e.g., non-random) data inputs.

Various selection functions that are expected to have random-like chunk size distribution in the face of real-life data may be referred to herein as having good "bit-scrambling" ability. One performance goal for the present invention may involve two aspects: one is easily understood, namely, speed of operation; the other, somewhat abstract, is the aforementioned bit-scrambling behavior. The present invention may provide a mechanism for data processing applications to greatly increase the speed of operation, while still retaining a measure of control over how much bit-scrambling ability may possibly be compromised. Selection functions satisfying the abstract bit-scrambling goal well may result in applications better able to fulfill non-abstract goals particular to their domain. For example, in various applications these goals may be related to duplicate detection, including: better duplicate detection, better potential duplicate detection, better resemblance detection, less data transmitted, increased bandwidth, decreased storage requirements, etc. Use of the present invention within such applications may result in them fulfilling, for example, non-abstract goals at greater speed. Some specific applications of the present invention may focus on data storage system(s) as an example, in which instance the concrete performance goals may be speed and amount of duplicate elimination. Hence, hash functions that may yield better performance (in our sense) on real-world data may tend to have little bitwise correlation between the value at on instant or window and the value at the next instant or window. Desirable hash functions may be highly likely to randomly influence all bits of the hash value when the window is rolled from one time in the input data stream to the next.

An example of a selection function which may perform well with random data but fails in real life is H='count the number of non-alphabetic characters (not in [A-Za-z]) within a 30-byte window' coupled with a selection rule 'H=0'. For random data input, H will be zero randomly, with probability (204/256)**30~=0.0011, so one in 908 windows will produce a selection, and an exponential distribution of chunk sizes averaging around 908 bytes is to be expected. Unfortunately, if storing an archive of news clippings, the number of occurrences of 30-letter words is likely to be much rarer than this expectation, and few useful chunk points are likely to result.

Hash functions that may yield "better" performance on real-world data will tend to have little bitwise correlation between the value at one instant or window and the value at the next instant or window. Desirable hash functions may be highly likely to influence all bits of the hash value when the window is rolled from one time in the input data stream to the next. Desirable hash functions are also likely to affect many bits randomly when a single bit within an input window changes. Similar notions correspond to more conventional definitions of good hash function characteristics, and functions fulfilling these properties may result in good bit-scrambling ability for the purposes of various applications using the present invention. In any case, it may be commonly assumed that such hash functions will perform well even when presented with non-random, real-world data.

The boxcar function, for example, may be particularly bad in scrambling the least significant bits of its hash value over bytes of input, the least significant bit being trivially related to only the parity of bit 0 of the input data windows. However, the speed with which the boxcar function may evaluate a hash for successive windows of input data may make it particularly attractive for use in the present invention. Furthermore, the selection criterion for the boxcar hash may be modified in some embodiments to avoid usage of bit zero to accomplish the selection function. The companion patent mentioned above, U.S. Patent Application titled METHODS AND SYSTEMS FOR QUICK AND EFFICIENT DATA MANAGEMENT AND/OR PROCESSING provides an example of a large dataset for which the application's performance goal of speed and duplicate elimination was greatly improved by the present invention: a large increase in speed was measured, while the amount of duplicate elimination was verified on a 1.1 Terabyte real-life dataset to be virtually identical to that obtained with several embodiments using, for example, Rabin fingerprinting or multiplicative linear congruential generator (MLCG) hashes only to accomplish content-defined chunking.

Referring to FIG. 1, an exemplary data management or processing system 100 using multi-mode data boundary point/data block determination is provided, according to at least one embodiment of the present invention. In this exemplary system, input data 110 may be provided to a Faster Boundary Point/Data Block Window Module 120. This input data 110 may be, for example, a sequence of files or packets of data in binary 1's and 0's that may need to be processed, transmitted or stored in one or more electronic devices such as a microprocessor, a storage disk, a memory, a computer system, etc. The module 120 may be able to more quickly process the determination of hash, cut, boundary or break points in the input data 110 because it may use a method, for example a boxcar summation process or function, that takes less processing time than traditional processes for determining good hash, cut, boundary or break points. Although, module 120 might not provide the best selection of hash, cut, boundary or break points in the data, its speed will make up for the lesser quality hash, cut, boundary or break points (e.g., may result in less duplicate data being identified). In various embodiments, the module 120 may pre-select a subset of all possible hash, cut, boundary or break points. Some exemplary easily rollable hash functions may include a boxcar sum function, an successive multiply-by-constant and add-byte-value (MLCG) function, a rolN-xor function, etc. The Faster Boundary Point/Data Block Window Module 120 may be coupled to a Slower Faster Boundary Point/Data Block Window Module 130. Module 130 may take relatively more processing time per iteration than module 120, however, it is able to make better possible hash, cut, boundary or break point determinations (e.g., may result in more duplicate data being identified). In various embodiments, module 130 may utilize a CRC32c function, a Rabin fingerprint function, a SHA-1 function, etc., that may incorporate rolling or non-rolling windows. A table of various cut, break, hash, block point functions is illustrated in Table I below, showing various speeds achieved during simulation.

TABLE I

| name | pseudo-code (non-rolling) | speed MB/s |
| --- | --- | --- |
| boxcar | hash += b | 360 |
| MLCG | hash = hash * A + b | 270 |
| rolN-xor | hash = ROL(hash,N ) ^ b | 280 |
| rolN-xor[ ] | hash = ROL(hash,N ) ^ A[b] | 175 |
| xor | hash = A[b] | 170 |
| xAdler | s1 +=b; s2 +=s1 ; hash=s1 ^s2 ; hash =hash> >6; | 160 |
| Rabin | hash = ((hash< <8)|b) ^ A[hash> >N ] | 145 |

Some simple Hash Functions are provided above in Table I. Hash is assigned a constant initial value. For each byte in the window, hash is modified by adding the next byte value b. The hash functions listed here have fast rolling versions. Here A and N are hash-specific constants and ROL is a rotate-left operation. The xAdler hash is a simplified version of the Adler(/Fletcher) hash. Speed values are representative of fairly optimized code with a maximal amount of compile-time constants, and should be viewed as a reasonable indication of the hash function speed. The speed tests measure rolling the hash and checking for terminal zero bits on several hundred megabytes of in-memory random data. As can be observed in Table I, algorithm speeds roughly follow the number of external lookups required, with boxcar, MLCG, and rolN-xor hashes being the fastest, with zero table lookups. The rolling versions (see below) or xor, rolN-xor[ ] and Rabin hashes require two lookups of form A[b].

Specific versions of C++-like code for various exemplary non-rolling and corresponding rolling versions of hash functions are illustrated below. In the exemplary code, ws is the window size and buf may be an input data buffer of bytes. The function calc(buf) is a non-rolling calculation of checksum csum, while roll(buf) is a rolling version that will update a checksum whose value is calc(buf) to the value at calc(&buf[1]) in fewer operations. It may be assumed that a global table of constant random numbers may be available as rndTable[256] for the algorithms requiring pre-translation of input bytes into more random 32-bit quantities. Several algorithms may roll more quickly if the window size is a compiler-time constant. Actual code may use various optimizations, such as compiler optimization options, to achieve faster speed.

An exemplary Boxcar C++-like pseudocode for non-rolling calc and rolling roll routines is shown below.

```
1 void Boxcar::calc( unsigned char const* const buf ) {
2    csum = std::accumulate( buf, buf+ws, 0xffffc03fU );
3 }
4 void Boxcar::roll( unsigned char const* &buf ) {
5    csum += buf[ws] – buf[0];
6    ++buf;
7 }
```

An example of MLCG C++-like pseudocode for non-rolling calc and rolling roll routines, using a multiplicative linear congruential generator module $2^{32}$, is shown below. With this choice, modulo operations may not be required on 32-bit machines as overflow of 32-bit arithmetic operations perform this function implicitly.

```
1 MLCG::MLCG( uint32_t windowsize )
2    : ws( windowsize )
3    , init( 4329005U ) // seed value
4    , mult( 741103597U ) // a large prime for pseudorandom sequences
5    , mult_ws( 1UL ) // mult^ws
6    , magic( init * (1U-mult) ) // precalc. for rolling version
7 {
8    for(uint32_t i=0U; i<ws; ++i) mult_ws *= mult;
9    // (mult_ws is actually calculated more efficiently)
10   magic *= mult_ws;
11 }
12 void MLCG::calc( unsigned char const* const buf ) {
13   csum = init;
14   for( unsigned char const *p=buf, *pEnd=&p[ws]; p!=pEnd; ++p){
15      csum = csum * mult + *p;
16   }
17 }
18 void MLCG::roll( unsigned char const* &buf ) {
19   csum = csum * mult – mult_ws * buf[0] + buf[ws] + magic;
20   ++buf;
21 }
```

An exemplary rolNxor C++-like pseudocode for non-rolling calc and rolling roll routines, using a rotate-left function rol32 by 5 bits and assuming a 64-byte window for simplicity (so that no fixups rol operations are needed for the roll functions, is show below.

```
1 RolNxor::RolNxor(uint32_t windowsize, uint32_t rolbits)
2    : ws ( windowsize )
3    , N( rolbits )
4    , M( ((ws-1) * N)& 0x1fU )
5    , init( 0x356a356aU ) // some constant value
6 { }
7 void RolNxor::calc( unsigned char const * const buf) {
8    csum = init;
9    for( unsigned char const *p=buf *pEnd=&p[ws]; p!=pEnd; ++p){
10      csum = rol32 (csum,N) ^ *p;
11   }
12 }
13 void RolNxor::roll( unsigned char const * &buf ) {
14   csum = rol32(csum ^ rol32(buf[0],M), N) ^ buf[ws];
15   ++buf;
16 }
```

An exemplary rolNxor[ ] C++-like pseudocode for non-rolling calc and rolling roll routines, using a rotate-left function rol32 by 5 bits and assuming a 64-byte window for simplicity (so that no fixups rol operations are needed for the roll function), is show below.

```
1 RolNxorTable::RolNxorTable(uint32_t windowsize, uint32_t rolbits)
2    : ws ( windowsize )
3    , N( rolbits )
4    , M( ((ws-1) * N) & 0x1fU )
5    , init( 0U ) // some constant value
6 { }
7 void RolNxorTable::calc( unsigned char const * const buf) {
8    csum = init;
9    for( unsigned char const * p=buf, *pEnd=&p[ws]; p!=pEnd; ++p){
10      csum = rol32 (csum,N) ^ rndTable[* p];
11   }
12 }
13 void RolNxorTable::roll( unsigned char const * &buf ) {
14   csum = rol32(csum ^ rol32(rndTable[buf[0]],M), N) ^ rndTable[buf[ws]];
15   ++buf;
16 }
```

An exemplary xor hash C++-like pseudocode for non-rolling calc and rolling roll routines, identical to rolNxor[ ] except without the rotation operation, is shown below.

```
1 void XorTable::calc( unsigned char const* const buf ) {
2    csum = init;
3    for( unsigned char const *p=buf, *pEnd=&p[ws]; p!=pEnd; ++p){
4       csum = rndTable[*p];
5    }
6 }
7 void XorTable::roll( unsigned char const* &buf ) {
8    csum ^= rndTable[buf[0]] ^ rndTable[buf[ws]];
9    ++buf;
10 }
```

An exemplary xAdler C++-like pseudocode for non-rolling calc and rolling roll routines, using for example, a modified version of the Adler (/Fletcher) hash with no table lookup, is shown below. The routines demonstrate a roll function that rolls internal state, while producing a checksum value in another distinct step, provided by the scramble function. Alternatively, rndtable[ ] could have been used, in conjunction with a more standard Adler algorithm.

```
1 xAdler::xAdler( uint32_t windowsize )
2 : ws( windowsize )
3 , magic( 1493U ) // to increase range of affected bits slightly,
4                 // value is related to expected size of ws
5 , s1( 0U ) // s1 and s2 are internal state
6 , s2( 0U ) // used to produce a checksum
7 { }
8 // hash is some way to generate csum from the internal state
9 uint32_t scramble( uint32_t x, uint32_t y ) {
10    x ^= y;
11    x ^=(x>>6);
12    return x;
13 }
```

-continued

```
14 void xAdler::calc( unsigned char const* const buf) {
15    s1 = s2 = 0U;
16    for( unsigned char const *p=buf, *pEnd=&p[ws]; p!=pEnd; ++p){
17        s1 += *p + magic;
18        s2 += s1;
19    }
20    // add a final bit-scramble
21    csum = scramble(s1,s2);
22 }
23 void xAdler::roll( unsigned char const* &buf ) {
24    s1 += buf[ws] - buf[0];
25    s2 += s1 - ws * ( buf[0] + magic );
26    ++buf;
27    csum = scramble(s1,s2);
28 }
```

An exemplary Rabin C++-like pseudocode for non-rolling calc and rolling roll routines for a simple implementation of a CRC is shown below. Tables of constants T[256] and U[256] may be calculated following, for example, A. Broder, Sequences II: Methods in Communications, Security, and Computer Science pp. 143_152 (1993).

```
1 Rabin::Rabin( uint32_t windowsize, uint32_t poly )
2  : ws( windowsize )
3    , p( poly ) // The irreducible generating polynomial
4  {
5    // precompute tables T[256] and U[256] of constants related
6    // to a generating polynomial. T describes how to append
7    // a new byte quickly. U describes how to add/remove a
8    // leading byte quickly (U depends on the window size).
9  }
10 // adding a byte modifies the old crc value in this way:
11 uint32_t append8 ( uint32_t crc, unsigned char byte) {
12     return T[ ((crc>>24) ^ byte) & 0xff ] ^ (crc << 8);
13 }
14 void Rabin::calc( unsigned char const * const buf) {
15    uint32_t csum=0ULL;
16    for( unsigned char const *p=buf, *pEnd=&p[ws]; p!=pEnd; ++p){
17        csum = append8( csum, *p );
18    }
19 }
20 void Rabin::roll( unsigned char const* &buf ) {
21    csum = append8( csum ^ U[buf [0]], buf[ws] );
22 }
```

When the simple hash functions in Table I are used in chunking algorithms, the actual speed may be substantially less, because data may be supplied in small chunks and extra buffer management may be needed. Furthermore, a chunking application may also typically require a strong hash function to be calculated for the entire chunk.

Further, in various embodiments the methods used by module 120 and module 130 may be content-defined hashing and output Content Defined Block/Chunk Points 140. In general, rolling window functions are faster than non-rolling window functions. As mentioned earlier, in general, content based hashing techniques are better at identifying more duplicates than file or fixed block size hashing techniques. In any case, the content defined block/chunk points 140 may be used to improve the processing time while maintaining a reasonable quality level for processing the input data. In various embodiments, these content defined block/chunk points 140 may be used for identifying duplicate data, improving encryption, improving data transmission, etc. It should be noted that although module 130 may be fed by the output of module 120, the processes performed in these modules may occur to some extent in parallel or simultaneously (e.g., use in dual processor systems). Module 130 may in some embodiments have direct recourse, additionally, to input data 110. For example, if it is determined that exceptionally the module 120 has failed to meet predetermined criteria, module 130 could embark upon a presumably slower and less desirable process of processing the input data via an alternate mechanism for content-defined chunking, as indicated by the dashed line 150. Such an alternate mechanism may be provided by a technique using, for example, known functions to determine a set of chunk points to be used as output for step 140.

Figure 2:
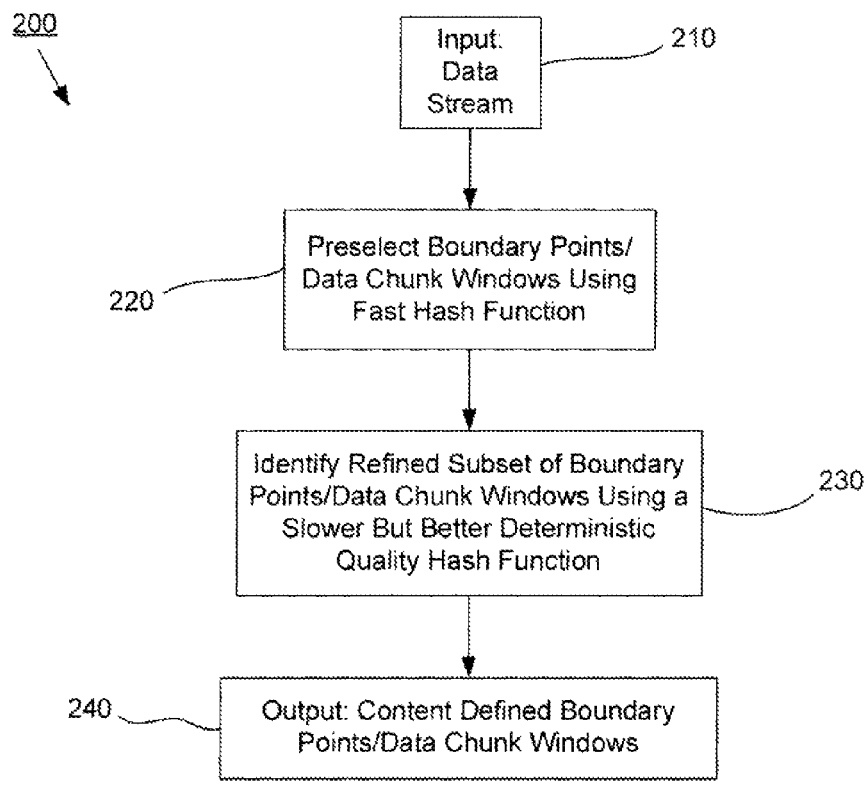
FIG. 2 is an exemplary data management or processing method using multi-mode data boundary point determination, according to at least one embodiment.

Referring to FIG. 2, an exemplary data management or processing method 200 using multi-mode data boundary point/data block determination is provided, according to at least one embodiment of the present invention. In this embodiment, at step 210, a data stream or data is provided as an input to the process. Next, at step 220, pre-selection of boundary points/data chunk windows is performed. In various embodiments, the pre-selection may be performed using a fast hash function. Some exemplary fast hash functions may include a boxcar sum function, a rol-5-xor function, a successive multiple-by-constant and add-byte-value function, etc. Then, at step 230, a refined subset of boundary points/data chunk windows may be identified using a slower but better deterministic function, for example, a quality hash function that identifies hash, cut, boundary, or chunk points that will maximize a preferred characteristic such as identification of duplicate data in the input data. Some exemplary processes for slower higher quality hashing may include, for example, a Rabin fingerprint function, a SHA-1 function, etc., that may incorporate rolling or non-rolling windows. Finally, in step 240, the process may output a content defined boundary point (s)/data chunk windows that may be used in determining, for example, hash values for determining data duplication and/or duplication elimination in some of the embodiments of the present invention.

Figure 3:
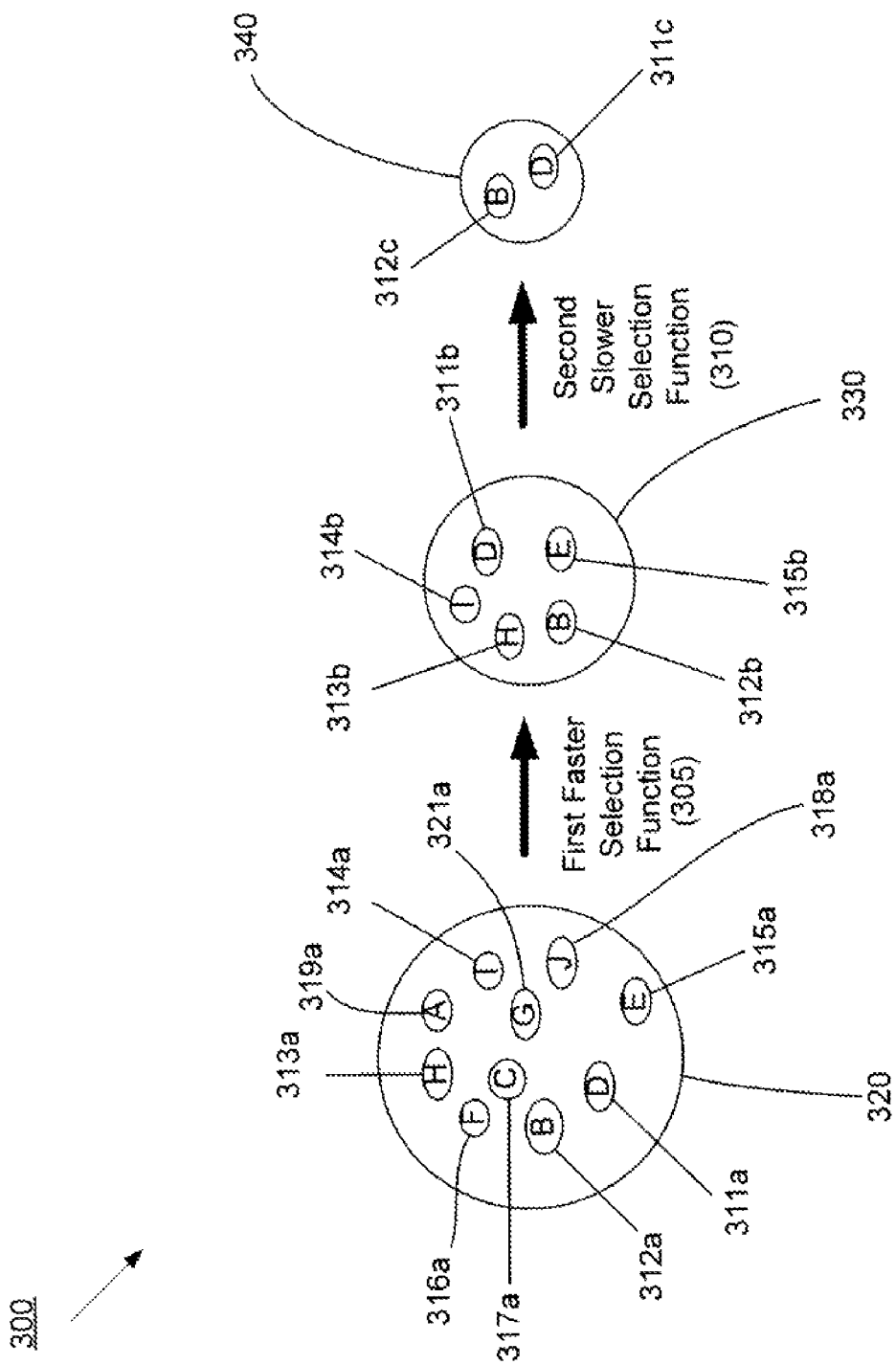
FIG. 3 is an exemplary illustration of how data management or processing using multi-mode data boundary point determination system(s) and method(s) operates, according to at least one embodiment.

Referring to FIG. 3, an exemplary conceptual illustration 300 of data management or processing using multi-mode data boundary point determination system(s) and method(s) operates is provided, according to at least one embodiment of the present invention. In this illustration, it is shown that the first faster selection function (305) and the second slower selection function (310) may operate together to more quickly identify (processing more megabytes per second) the desirable hash, cut, boundary or chunk points and/or windows 340 from a large set of possible data points/windows 320. The large set of possible hash, cut, boundary or chunk points and/or windows 320 may include, for example, data points or chunks A (319a), B (312a), C (317a), D (311a), E (315a), F (316a), G (321a), H (313a), I (314a), and J (318a). The first faster selection function 305 may process the large set of possible data points/windows 320 to quickly select a reasonably good pre-selected sub-group of desirable hash, cut, boundary or chunk points and/or windows 330. In this example, data points and/or data windows that are pre-selected into sub group 330 include data points and/or windows B (312b), D (311b), E (315b), H (313b), and I (314b). The processing speed of the first faster selection function 305 may be, for example, approximately 2 times faster than the second slower selection function 310. However, the data hash, cut, boundary, or break points and/or data windows it selects may have a lesser performance or may be less desirable than those that would be selected by the second slower selection function 310, if only the second slower selection function 310 analyzed the data set 320. On the other hand, the first faster selection function 305 may be capable of providing a reasonable number of data hash, cut, boundary, or break points and/or data windows 320 so that statistically these points are highly likely to contain many of the data break points and/or windows that have the highest quality of most desirable characteristics. Thus, the second slower selection function 310 may process the data points and/or windows including B (312*b*), D (311*b*), E (315*b*), H (313*b*), and I (314*b*) and select group 340 including data points and/or windows including B (312*c*) and D (311*c*) which have high quality characteristics, for example, identify most of the desirable data hash, cut, boundary, or break points and/or data windows. This process may go on repeatedly until all the data in a data set or data stream has been processed.

Figure 4:
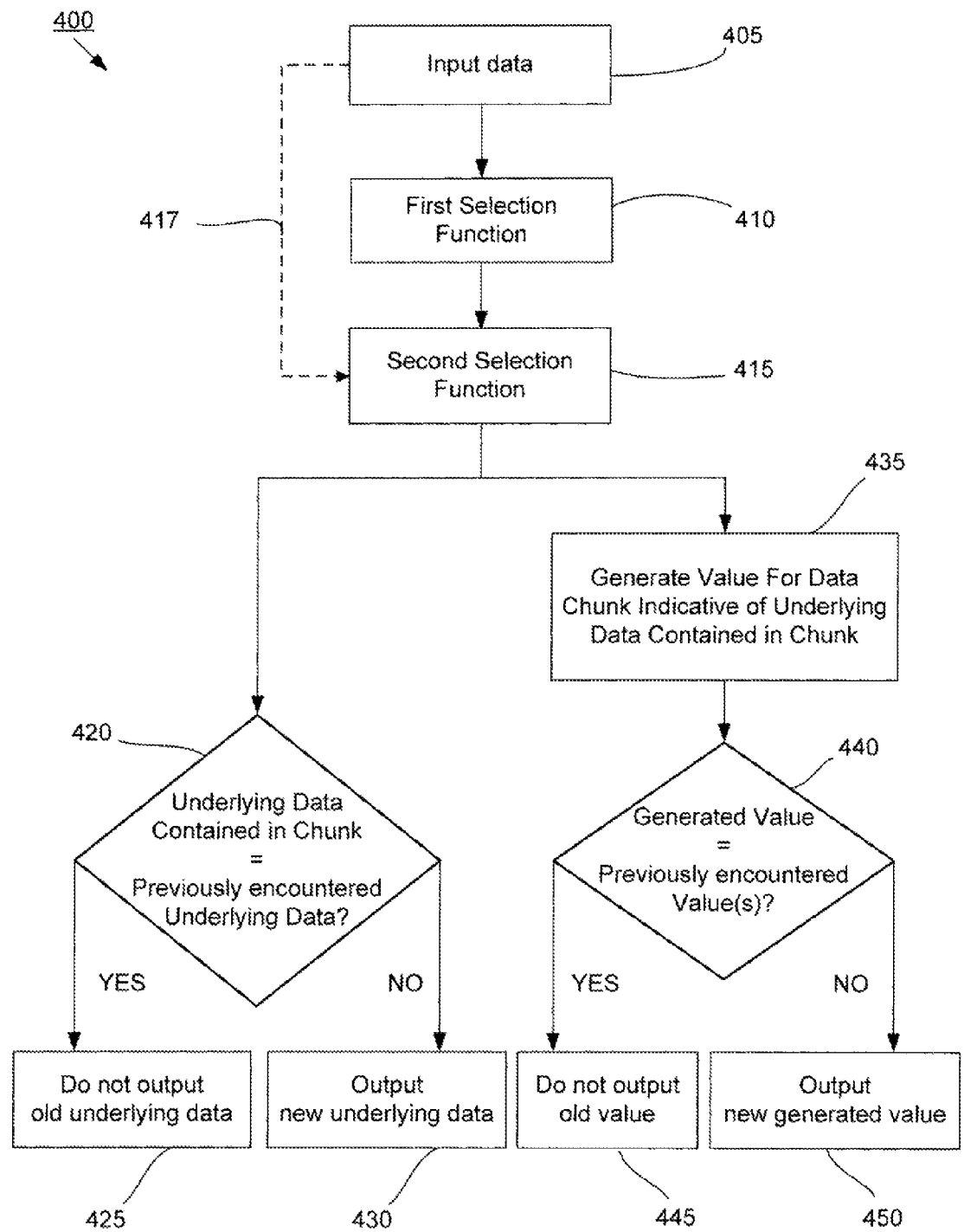
FIG. 4 is a detailed exemplary method for data management or processing that uses multi-mode data boundary point determination for identification of previously encountered data in a data set or stream, according to at least one embodiment.

Referring now to FIG. 4, an exemplary method for data management or processing 400 that uses multi-mode data boundary point determination for identification of previously encountered data in a data set or stream is provided, according to at least one embodiment of the invention. First, in step 405 input data may be provided for processing. This input data 405 may be, for example, a sequence of files or packets of data in binary 1's and 0's that may need to be processed, transmitted or stored in one or more electronic devices such as a microprocessor, a storage disk, a memory, a computer system, etc. Next, in step 410, a first selection function may be performed. The first selection function may be a faster selection function that identifies where one or more logical break or boundary points may be made in the data set or data stream based on a predetermined data processing objective. In various embodiments, the first selection process 410 may be a reasonably fast hashing function for identifying hash, cut, boundary or break points in the data set or data stream, but may offer reduced bit scrambling ability. The first selection may identify a subset of all possible hashing, cut, or break points that may be input to the second selection function. A faster first selection function may be defined as a function that is able to give a checksum faster based on megabytes of input data processed per second. Some exemplary first selection functions 410 may include a boxcar sum function, a rol-5-xor function, a successive multiple-by-constant and add-byte-value function, etc., some of which have been described in more detail above and some are described in more detail below. Then, in step 415, a second selection function may be performed having better performance at selecting the preferred hash, cut, or boundary break points in the data set or data stream. In various embodiments, this second selection function may be slower than the first selection function but provide better discriminating and/or accuracy in identifying the preferred (based on a desired characteristic, for example, duplication identification and/or elimination) hash, cut, boundary or break points in the data set or data stream. Some exemplary second selection function 415 may include a CRC32c function, a Rabin fingerprint function, etc, as described above and may be described in more detail below. In some embodiments, the second selection function may only consider the subset of hash, cut, boundary or break points in the data set or data stream identified by the first selection criteria. In this way, compared to a single-mode selection technique the process may be performed more quickly and take less processing time.

In other embodiments, a second selection function may notice that the output of the first selection function fails to satisfy predetermined criteria and may provide (within the second selection module) an alternate mechanism to produce the chunk points. Such an alternate mechanism may operate much more slowly, and may preferably operate only in exceptional circumstances. For example, if it is noticed that every window of input is selected by the first selection function, leading to a large number of chunks of size 1, or that the first selection function is producing chunks at a statistically improbably low rate (compared to expectations based on random inputs), then the second selection function may decide that the first selection function was insufficient. In this case, the alternate policy invoked may have recourse to the original data, (shown as dashed line 417) to produce final chunk or break points using, for example, a chunking technique using a hash function of better bit-scrambling ability than provided by the first (fast) selection function.

Next, one or both of steps 420 or 435 may be performed. At step 420, the most recent underlying data contained in the chunk may be identified along with previously encountered underlying data so that they may be compared. At step 420, the most recent underlying data may be compared to all previously encountered underlying data to see if there are any matches. For example, in various embodiments new underlying data may be compared with previously stored or transmitted underlying data. If, at step 420, there is a match, then at step 425 the most recent underlying data that matched previously encountered underlying data is not outputted. For example, in various embodiments the duplicate may be detected. In that case, then the duplicate underlying data may be eliminated. On the other hand, if at step 420 the most recent underlying data does not equate to any of the previously encountered underlying data, then at step 430 the new underlying data may be outputted (e.g. stored or transmitted).

At step 435, a value for the selected data chunk(s) or block(s) may be generated that is indicative of the underlying data contained in the data chunk(s) or block(s). For example, a hash value may be generated to represent the particular data contained in the data chunk(s) or block(s). One exemplary function for generating the value may be, for example, a SHA-1 function. Another example may include generating a value for a data chunk size of a data chunk determined by one or more chunk points of the subset. Next, at step 440, the most recently generated value from step 435 may be identified along with previously generated values so that they may be compared. The most recently generated value is compared to all previously generated and encountered values to see if there are any matches. For example, in various embodiments a newly generated hash value may be compared with previously generated and/or stored or transmitted hash values. If, at step 440, there is a match, then at step 445 the most recently generated value that matched a previously generated value may not be outputted. For example, in various embodiments the duplicate may be detected. In that case, then the duplicate data and its generated value may be eliminated, and a location indicator related to the prior stored hash value showing which location data is stored at so as to regenerate the eliminated data. On the other hand, if at step 440 the newly generated value, for example a hash value, does not equate to any of the previously encountered values, then at step 450 the newly generated value (e.g., hash value) and location indicator may be outputted and the data which it represents may be outputted (e.g. stored or transmitted). In the case of a hash value, it may be stored in a hash table for future reference.

Figure 5:
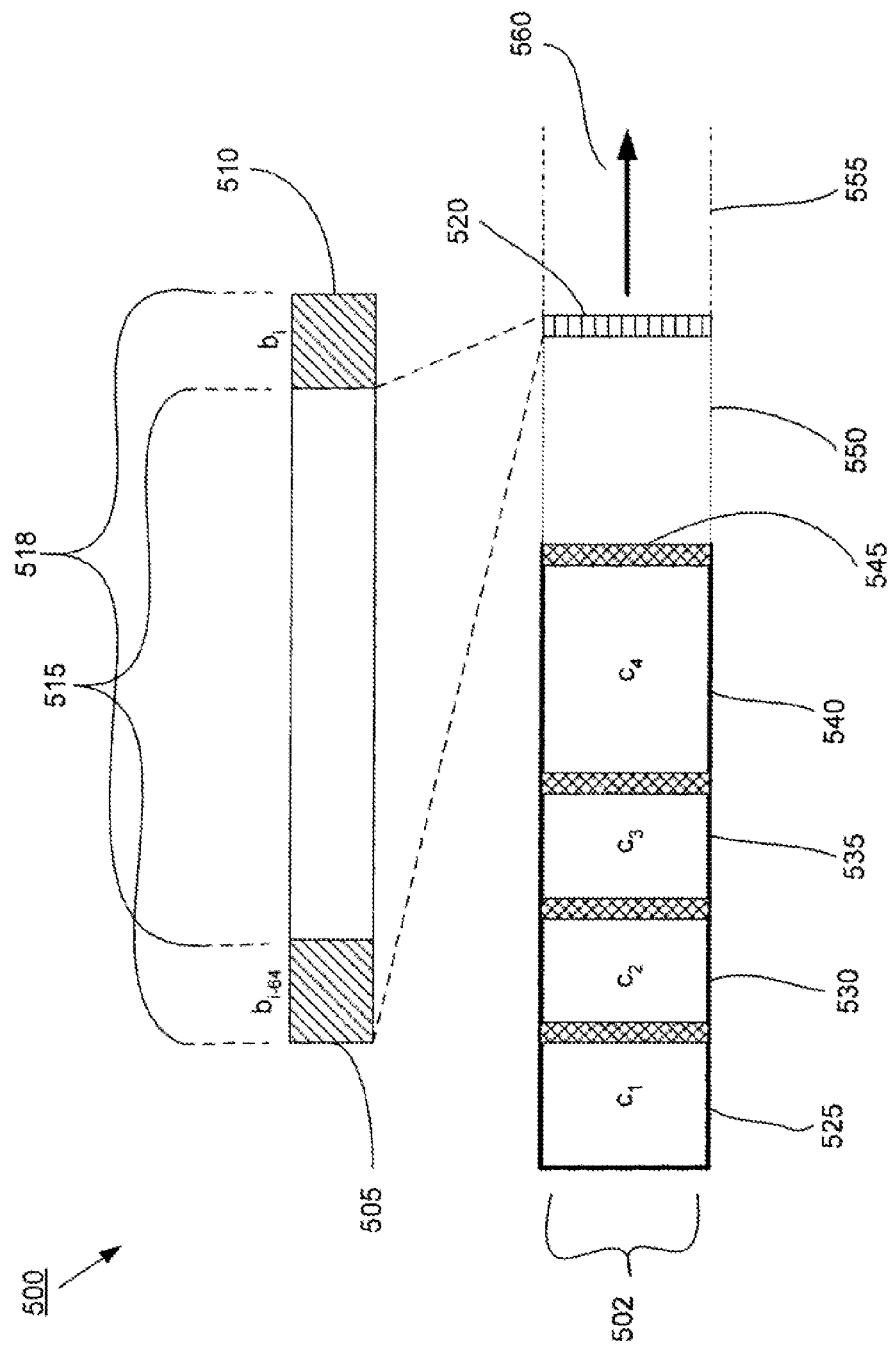
FIG. 5 is an exemplary hashing technique using content-defined data blocks or chunks, according to at least one embodiment.

Referring now to FIG. 5, an exemplary hashing technique using content-defined data blocks or chunks is provided, according to at least one embodiment of the present invention. Content-defined hashing functions operate by using a predetermined rule for determining at what point in a data set or stream that a hash, cut, boundary, or chunk point is to be made. This rule, for example X number of consecutive 0's or 1's, when applied to the data set or data stream will result in random hash, cut, boundary, chunk, or break points and variable length data chunks or data windows (e.g., $C_1$ 525, $C_2$ 530, $C_3$ 535, and $C_4$ 540 are each a different length) that may be hashed to produce a hash value. As another example, the content-defined data chunks may be based on a Rabin function in which fingerprints (unique representations of the underlying data based on a predetermined calculation) for each sliding window frame may be calculated. If the value of this calculation matches, for example, the x least significant bits of a constant, then a hash, cut, boundary, chunk, or break point may be determined and marked (e.g., selected) for later use in hashing a data block or window. The diagram 500 of FIG. 5 shows a data stream 502 that has been partially broken into chunks $C_1$ 525, $C_2$ 530, $C_3$ 535, and $C_4$ 540 using hash, cut, boundary, chunk, or break points. This may be accomplished by using a sliding window approach and adding a new byte 510 into a sliding window may be accomplished in two parts. The window area of the data steam may be portion 520, that may be for example a 64-byte window. At each step in the sliding window process, the oldest position of the sliding window may be subtracted and a new one added. The value for the oldest byte $b_{i-64}$ 505 in a first window 515 may be subtracted from the fingerprint and the value of the new byte $b_i$ 510 may then be added to the data fingerprint to form a second window 518. This approach may be made possible by having the fingerprint commutative over addition as in the simple boxcar function, or by more complicated mechanisms specific to the window size and the fingerprint calculation chosen for the sliding window frames. The process will continue over time as the new data 555 is provided to the process over time as shown by arrow 560. When subtracting the oldest bytes over time, speed and performance of the calculation may be improved by using pre-computed tables. As noted above, this Rabin fingerprint may be used as a second selection function to find better performance break points by virtue of its better bit-scrambling ability, and may be slower than the first selection function. However, there are alternative functions which may also have excellent bit-scrambling ability and may be used as the second selection function. For example, the SHA-1 function may be used, or specific versions of Rabin fingerprinting, such as the CRC32c hash, may be used.

Figure 6:
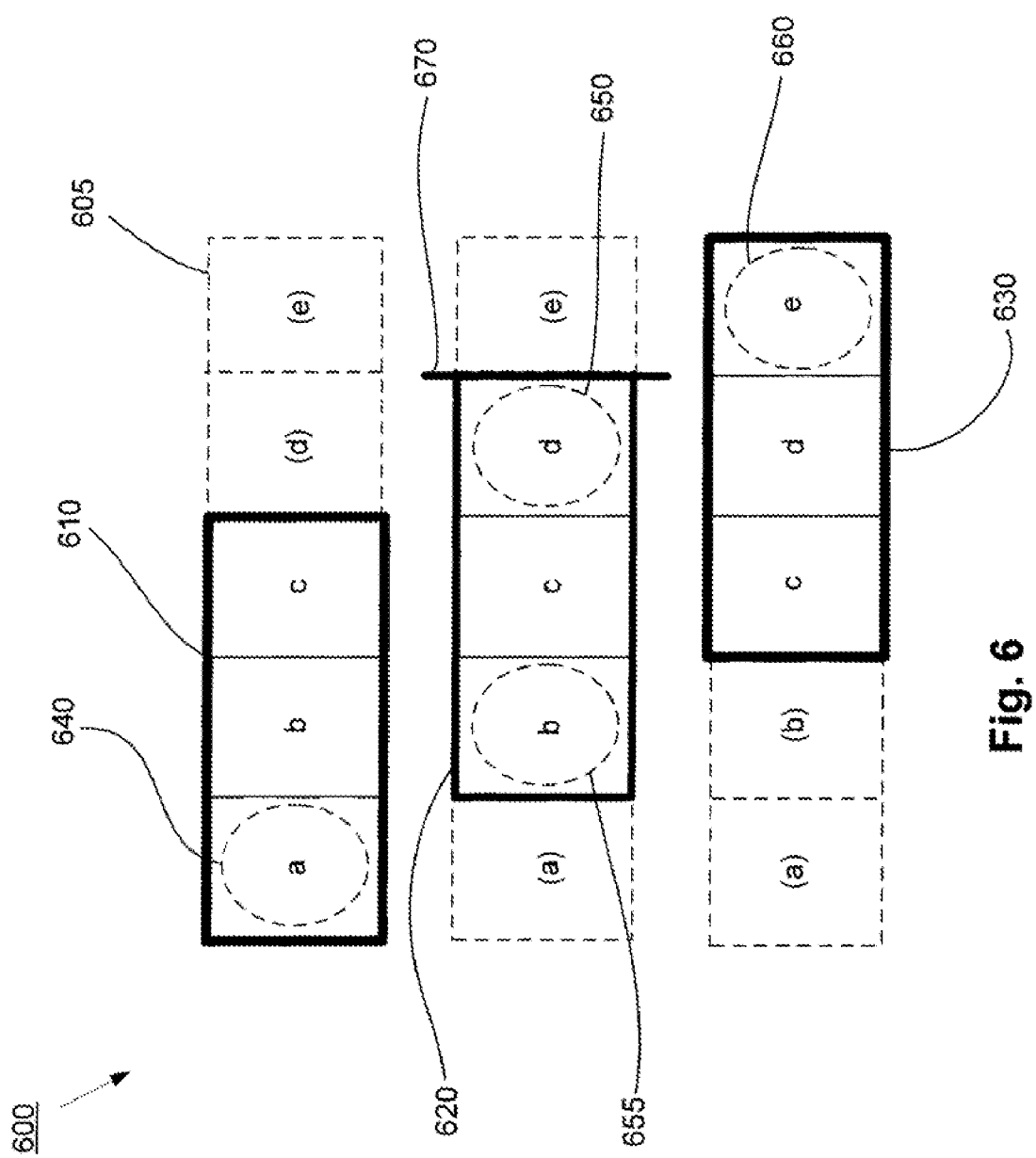
FIG. 6 is an exemplary first selection function using a boxcar sum technique, according to at least one embodiment.

Referring now to FIG. 6, an exemplary first selection function using a boxcar sum technique is illustrated 600, according to at least one embodiment. In this example, a boxcar sum function is used to determine hash, cut, boundary, chunk, or break points in a data set or data stream. In this case, again a sliding window approach may be used. Further, to make the process fast, the old data blocks that are subtracted and the new data blocks that are added may simply be a predetermined number of bytes or bits of data and the calculation may be simply a sum of adding up all the data values in each of the data blocks such that: Boxcar Sum=$\Sigma$ N-bytes from i=1 to n. As such, to calculate a new boxcar sum, the earliest group of data sum may be subtracted and the most recent group of data summation may be added. As shown, a data set or data stream 605 is provide for hashing and is comprised of groups of data a, b, c, d, and e. Data groups a, b, c, d, and e may be of equal bit or byte length, for example, 64 bits. The first window 610 may be made up of data groups a, b, and c. Data group "a" may have a sum total value (e.g., the sum of each value of each of the bits in group a) of, for example, 15. Data group "b" may have a sum total value of, for example, 10. Data group "c" may have a sum equal to 5. Data group "d" may have a sum total value of, for example, 10. Data group "e" may have a sum total value of, for example, 5. Given these values for the various data groups in the data stream or data set, the boxcar sum of window 610 may be 15+10+5=30. Then, the next boxcar sum may be calculated as the prior calculated sum minus the earliest group of data a 640, plus the newest group of data d 650: 30+15+10=25. Then, the next boxcar sum may be calculated as the prior calculated sum minus the earliest group of data b 6550, plus the newest group of data e 660: 25−10+5=20. If the function is set to make hash, cut, boundary, chunk, or break points where the sum is equal to 25, than the hash, cut, boundary, chunk, or break point subset would in this short example includes points 670. As can be seen, this may be a particularly simple and fast way to perform a first selection function for hashing of data, however, the quality of the hash points may be somewhat lower due to the lack of sophistication. As such, the boxcar sum approach can develop a pre-selection subset of potential hash, cut, boundary, chunk, or break points.

Figure 7A:
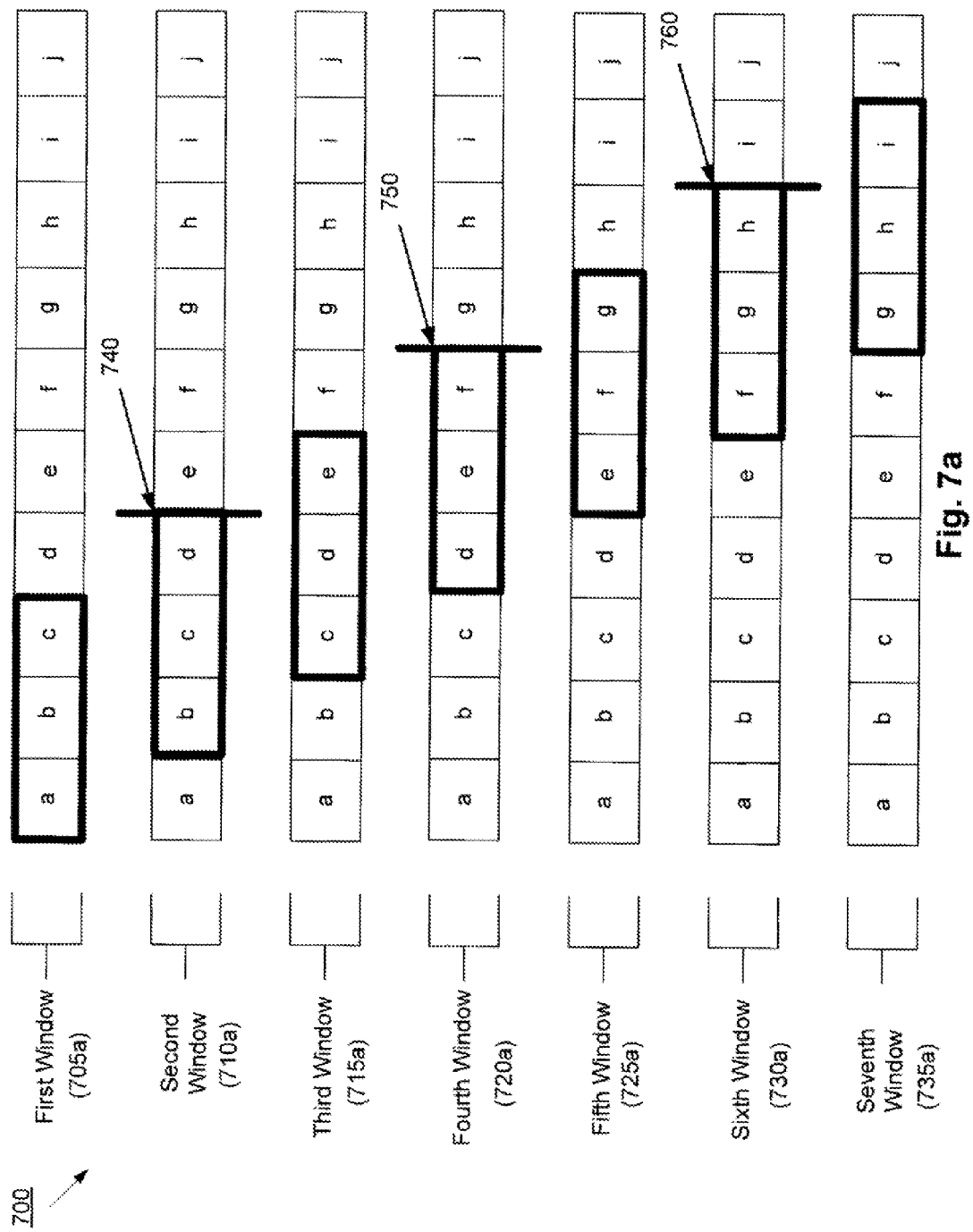
FIGS. 7a and 7b provide exemplary illustrations of data windows, blocks or chunks for an exemplary hashing technique using content-defined data blocks or chunks, according to at least one embodiment.
Figure 7B:
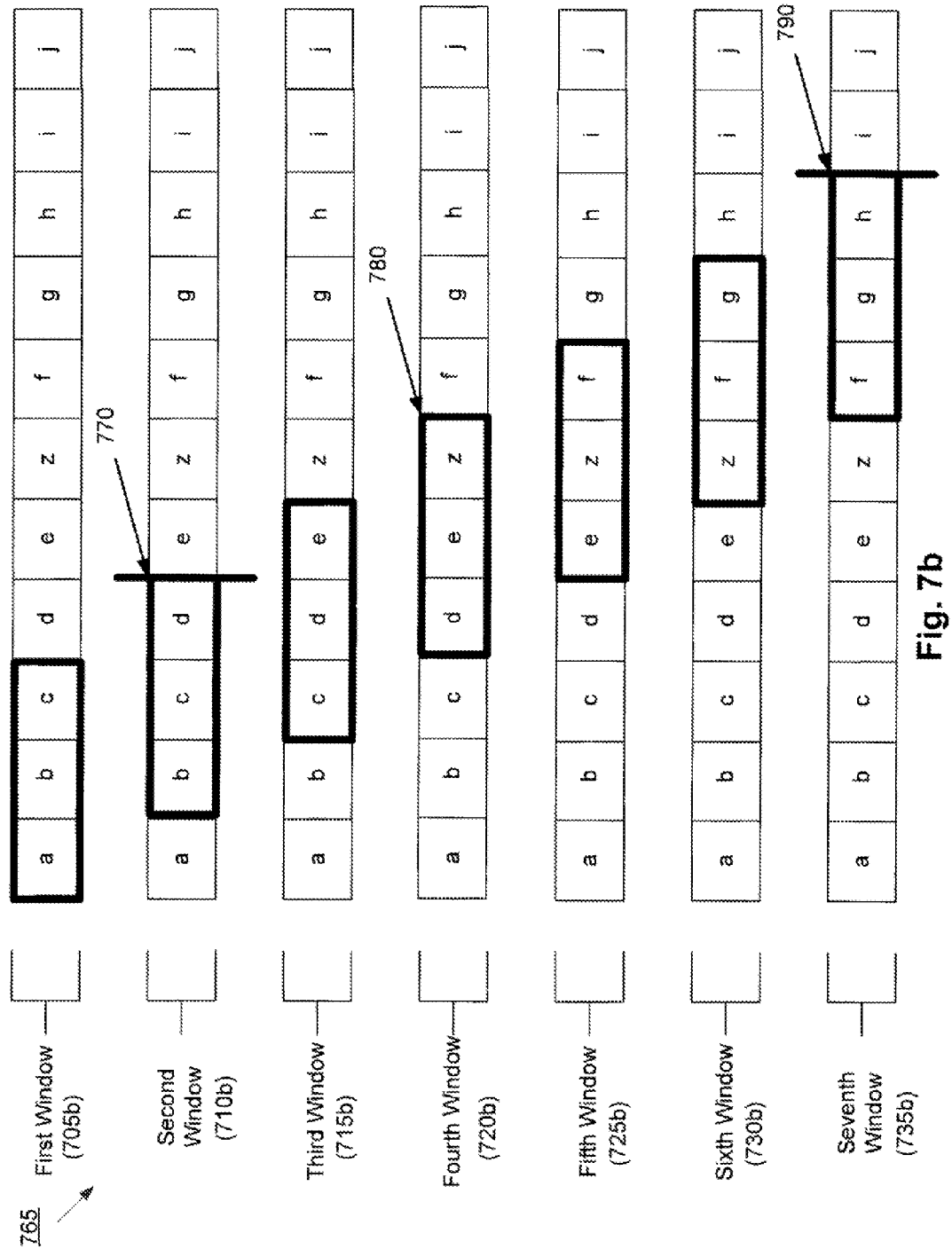

Referring to FIGS. 7a and 7b, exemplary illustrations of data windows, blocks or chunks are provided for an exemplary hashing technique using content-defined data blocks or chunks, according to at least one embodiment of the present invention. FIG. 7a shows chunking 700 at various points in the data stream where the fingerprint or hash value for various windows equals a predetermined value. Various functions may be applied with rolling, moving or sliding windows. This example may be indicative of either a faster or a slower selection function involving a rolling or sliding window, such as the boxcar sum or the Rabin fingerprint functions, and the criterion of equality to a predetermined value could be replaced with another criterion having some desired probability of occurrence. In this example, various windows (705a-735a) in a sliding window function are illustrated in bold and organized as a plurality of groups of data in the data set or stream having data groups a, b, c, d, e, f, g, h, i, and j. At various points in time, a new window is formed and evaluated against a predetermined value to determine if a hash, cut, boundary, chunk, or break point should be made. In this example, the predetermined value results in a hash, cut, boundary, chunk, or break point as identified at the end 740 of the second window 710a. As such, a hash value may be made of the data in the sum of data blocks a, b, c, and d. Then after performing hashing at two more sliding time windows, third window 715a and fourth window 720a, a hash, cut, boundary, chunk, or break point is identified at the end 750 of the fourth window 720a. As such, a hash value may be made of the data in the sum of data blocks e and f. Then after calculating the value of the data in the windows of two more sliding time windows, fifth window 725a and sixth window 730a, a hash, cut, boundary, chunk, or break point is identified at the end 760 of the sixth window 730a. As such, a hash value may be made of the data in the sum of data blocks g and h. As shown, the process continues to seventh window 735a without finding another value match and resulting hash, cut, boundary, chunk, or break point.

FIG. 7b shows chunking 765 at various points in the data stream where the fingerprint or hash value for various windows equals a predetermined value. This example illustrates how the hash, cut, boundary, chunk, or break point will change due to the introduction of a new data group z has been inserted within the earlier indicated data set or stream having data groups a, b, c, d, e, f, g, h, i, and j. As can be seen from this illustration, the introduction of a new data group may result in the elimination of one hash, cut, boundary, chunk, or break point that occurred before in the fourth window 720b; in this case no hash, cut, boundary, chunk, or break point is selected at 780. In this example, various windows (705b-735b) in a sliding window function are illustrated in bold and organized as a plurality of groups of data in the data set or stream having data groups a, b, c, d, e, f, g, h, i, and j, with new data group z inserted between e and f. At various points in time, a new window is formed and evaluated against a predetermined value to determine if a hash, cut, boundary, chunk, or break point should be made. In this example, the predetermined value results in a hash, cut, boundary, chunk, or break point is identified at the end 770 of the second window 710b. As such, a hash value may be made of the data in the sum of data blocks a, b, c, and d. Then after performing hashing at two more sliding time windows, third window 715b and fourth window 720b, the new data group z is encountered and a hash, cut, boundary, chunk, or break point is not identified at the end 780 of the fourth window 720b. Then after calculating the value of the data in the windows of three more sliding time windows (because the sliding window covers three data groups), fifth window 725b, sixth window 730b, and seventh window 735b, a hash, cut, boundary, chunk, or break point is identified at the end 790 of the seventh window 735b. As such, a new hash value may be made of the data in the sum of data blocks e, z, f, g and h. As shown, the insertion of a new data group z may change the output of the selection function at up to 3 locations because the change in the underlying data is limited to only a single data group and the sliding window includes three data groups. In FIG. 7, it is assumed that the effect was to make all three affected windows inactive during the selection criteria "equal to a predetermined value". Based on this example for a sliding window functions, one can appreciate how a change in data or a different data set can result in varying hash, cut, boundary, chunk, or break points. In various embodiments, once a hash, cut, boundary, chunk, or break point is identified, in the case of a faster selection function then a subset of hash, cut, boundary, chunk, or break points may be determined using, for example, a boxcar sum function with a rolling, sliding or moving window as described above, then a slower but better performing second selection function may be used. For example, a Rabin fingerprint function may then be performed using the subset of hash, cut, boundary, chunk, or break points pre-selected as its starting point, so as to reduce processing time while keeping a reasonable quality for hash, cut, boundary, chunk, or break points selection.

A particularly good example of a hashing function for the second selection function is the CRC32c. The CRC32c hashing function is a particular implementation of a Rabin fingerprint and may be found in, for example, J. Stone, R. Stewart and D. Otis, "Stream Control Transmission Protocol (SCTP) Checksum Change", The Internet Society, RFC 3309, September 2002, pages 1-17. This may illustrate the CRC32c standard and gives a sample implementation that describes this hash function. The CRC32c recommendation actually is a specific implementation of a hash based on polynomial division, so it may somewhat be considered a particular instance of a Rabin hash. The CRC32c is typically a 32-bit code and may specify a specific polynomial and method, more or less. These functions may be modified for C++ language and may be modified to supports 64-bit polynomials. The code for the second function may be generic (e.g., off-the-shelf) or hardwired. If it is "generic" it may turn out to be somewhat slower.

As noted above, in various embodiments the present invention may be used for data identification and duplicate data elimination. As such, subsequent to determining preferred hash, cut, boundary, chunk, or break points, a hash value for the determined chunk of data may be produced and compared with previously stored has values. In various embodiments, the present invention may be particularly applicable to data duplication elimination. Further, as also noted above, the present invention may be equally applicable to various electronic systems including wireless networks, the Internet, intranets, computer systems and networks with a string of data that is processed, stored, and/or transmitted and the use of hashing can prove useful. A description is provided below of some of the various systems upon which the present invention may operate.

Figure 8:
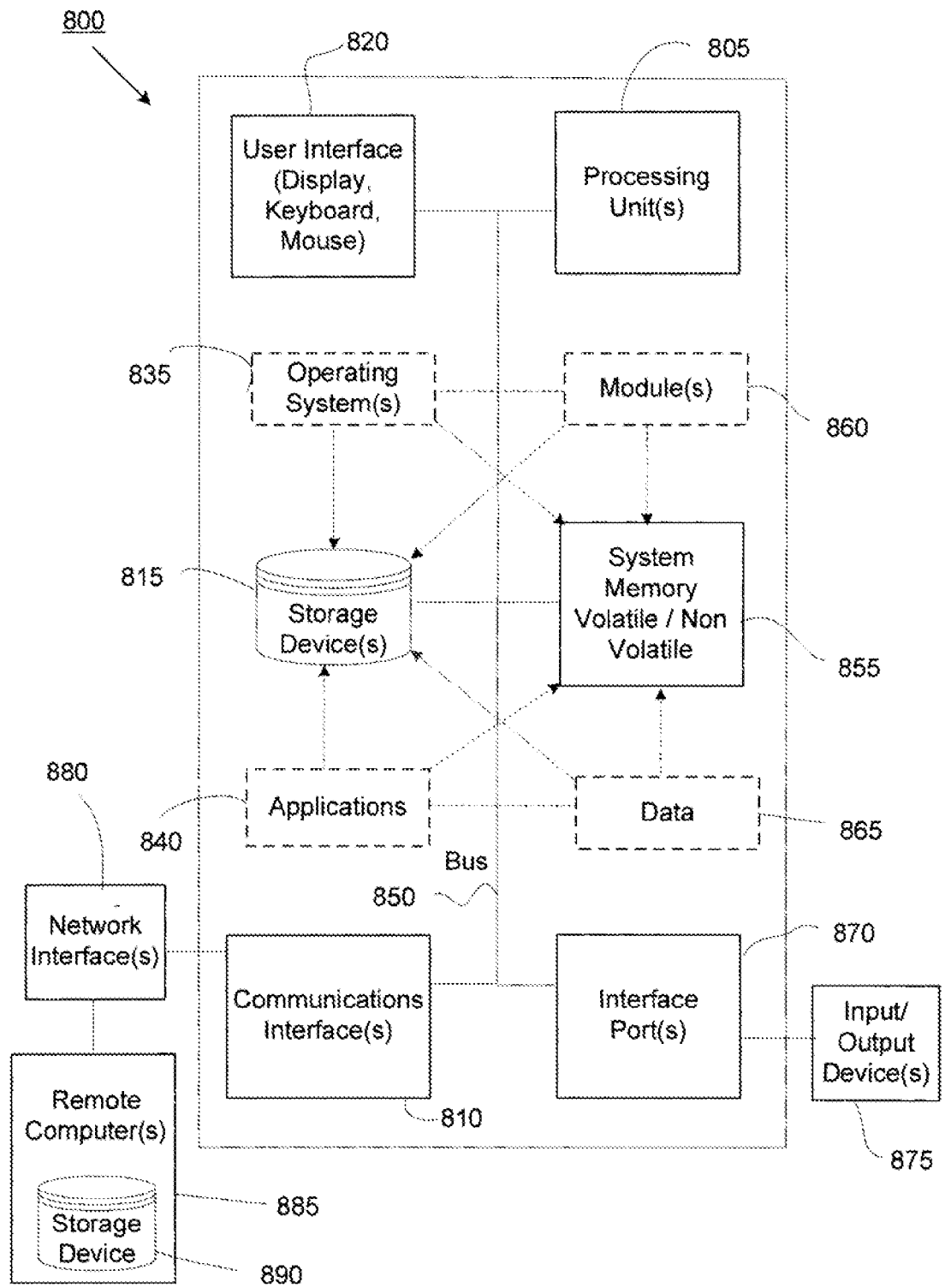
FIG. 8 is an exemplary functional block diagram of a computing device, according to at least one embodiment.

As noted, in various embodiments, the system(s) and method(s) provided herein may be implemented using a computing device, for example, a personal computer, a server, a mini-mainframe computer, and/or a mainframe computer, etc., programmed to execute a sequence of instructions that configure the computer to perform operations as described herein. In various embodiments, the computing device may be, for example, a personal computer available from any number of commercial manufacturers such as, for example, Dell Computer of Austin, Texas, running, for example, the Windows™ XP™ and Linux operating systems, and having a standard set of peripheral devices (e.g., keyboard, mouse, display, printer). FIG. 8 is a functional block diagram of one embodiment of a computing device 800 that may be useful for hosting software application programs implementing the system(s) and method(s) described herein. Referring now to FIG. 8, the computing device 800 may include a processing unit 805, communications interface(s) 810, storage device(s) 815, a user interface 820, operating system(s) instructions 835, application executable instructions/API 840, all provided in functional communication and may use, for example, a data bus 850. The computing device 800 may also include system memory 855, data and data executable code 865, software modules 860, and interface port(s). The Interface Port(s) 870 may be coupled to one or more input/output device(s) 875, such as printers, scanner(s), all-in-one printer/scanner/fax machines, etc. The processing unit(s) 805 may be one or more microprocessor(s) or microcontroller(s) configured to execute software instructions implementing the functions described herein. Application executable instructions/APIs 840 and operating system instructions 835 may be stored using computing device 800 on the storage device(s) 815 and/or system memory 855 that may include volatile and nonvolatile memory. Application executable instructions/APIs 840 may include software application programs implementing the present invention system(s) and method(s). Operating system instructions 835 may include software instructions operable to control basic operation and control of the processor 805. In one embodiment, operating system instructions 835 may include, for example, the XP™ operating system available from Microsoft Corporation of Redmond, Wash.

Instructions may be read into a main memory from another computer-readable medium, such as a storage device. The term "computer-readable medium" as used herein may refer to any medium that participates in providing instructions to the processing unit 805 for execution. Such a medium may take many forms, including, but not limited to, non-volatile media, volatile media, and transmission media. Non-volatile media may include, for example, optical or magnetic disks, thumb or jump drives, and storage devices. Volatile media may include dynamic memory such as a main memory or cache memory. Transmission media may include coaxial cable, copper wire, and fiber optics, including the connections that comprise the bus 850. Transmission media may also take the form of acoustic or light waves, such as those generated during Radio Frequency (RF) and Infrared (IR) data communications. Common forms of computer-readable media include, for example, floppy disk, a flexible disk, hard disk, magnetic tape, any other magnetic medium, Universal Serial Bus (USB) memory stick™, a CD-ROM, DVD, any other optical medium, a RAM, a ROM, a PROM, an EPROM, a Flash EPROM, any other memory chip or cartridge, a carrier wave as described hereinafter, or any other medium from which a computer can read.

Various forms of computer-readable media may be involved in carrying one or more sequences of one or more instructions to the processing unit(s) 805 for execution. For example, the instructions may be initially borne on a magnetic disk of a remote computer(s) 885 (e.g., a server, a PC, a mainframe, etc.). The remote computer(s) 885 may load the instructions into its dynamic memory and send the instructions over a one or more network interface(s) 880 using, for example, a telephone line connected to a modem, which may be an analog, digital, DSL or cable modem. The network may be, for example, the Internet, and Intranet, a peer-to-peer network, etc. The computing device 800 may send messages and receive data, including program code(s), through a network of other computer(s) via the communications interface 810, which may be coupled through network interface(s) 880. A server may transmit a requested code for an application program through the Internet for a downloaded application. The received code may be executed by the processing unit(s) 805 as it is received, and/or stored in a storage device 815 or other non-volatile storage 855 for later execution. In this manner, the computing device 800 may obtain an application code in the form of a carrier wave.

The present system(s) and method(s) may reside on a single computing device or platform 800, or on multiple computing devices 800, or different applications may reside on separate computing devices 800. Application executable instructions/APIs 840 and operating system instructions 835 may be loaded into one or more allocated code segments of computing device 800 volatile memory for runtime execution. In one embodiment, computing device 800 may include system memory 855, such as 512 MB of volatile memory and 80 GB of nonvolatile memory storage. In at least one embodiment, software portions of the present invention system(s) and method(s) may be implemented using, for example, C programming language source code instructions. Other embodiments are possible.

Application executable instructions/APIs 840 may include one or more application program interfaces (APIs). The system(s) and method(s) of the present invention may use APIs 840 for inter-process communication and to request and return inter-application function calls. For example, an API may be provided in conjunction with a database 865 in order to facilitate the development of, for example, SQL scripts useful to cause the database to perform particular data storage or retrieval operations in accordance with the instructions specified in the script(s). In general, APIs may be used to facilitate development of application programs which are programmed to accomplish some of the functions described herein.

The communications interface(s) 810 may provide the computing device 800 the capability to transmit and receive information over the Internet, including but not limited to electronic mail, HTML or XML pages, and file transfer capabilities. To this end, the communications interface 810 may further include a web browser such as, but not limited to, Microsoft Internet Explorer™ provided by Microsoft Corporation. The user interface(s) 820 may include a computer terminal display, keyboard, and mouse device. One or more Graphical User Interfaces (GUIs) also may be included to provide for display and manipulation of data contained in interactive HTML or XML pages.

Figure 9:
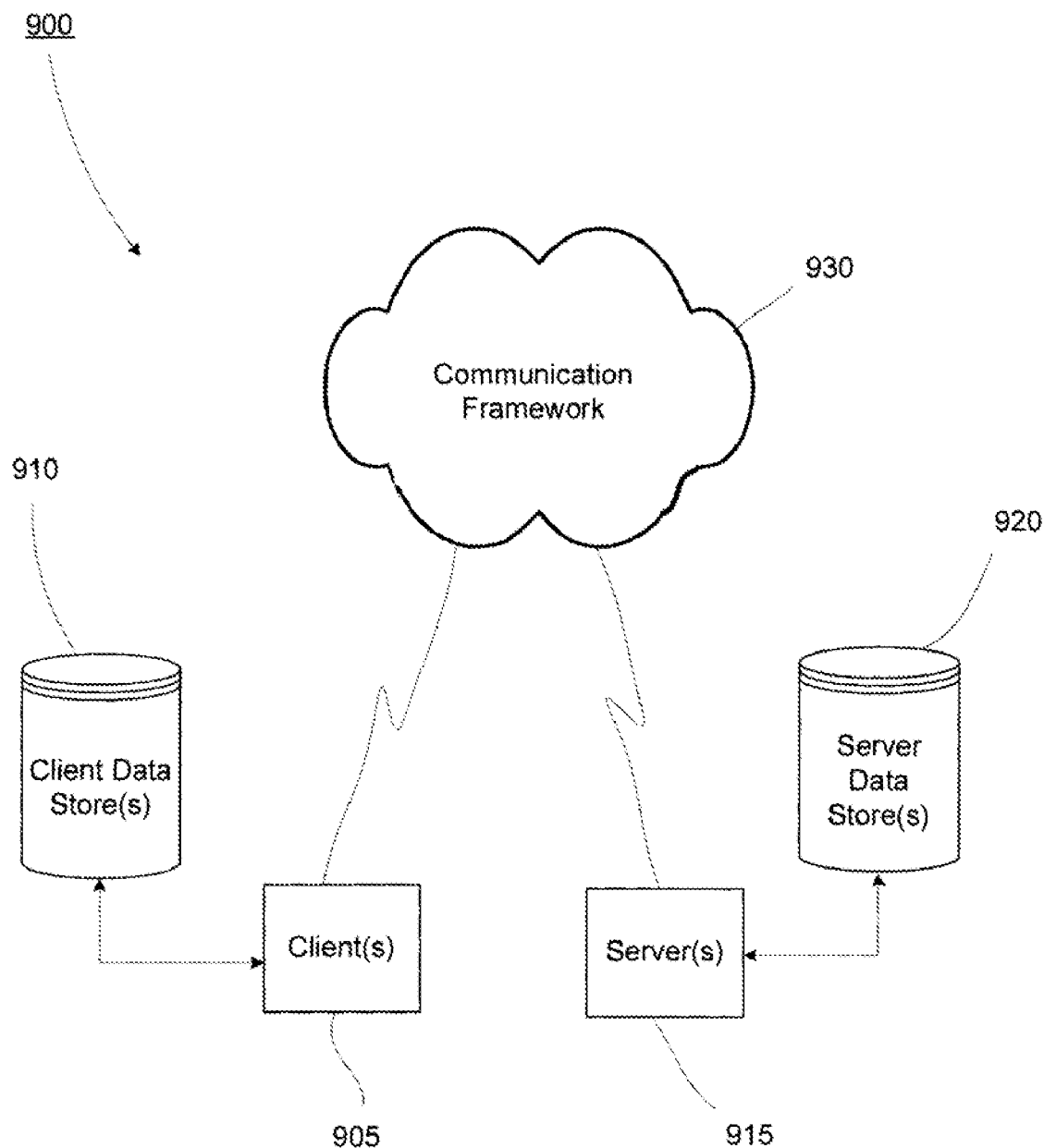
FIG. 9 is an exemplary functional block diagram illustrating a network, according to at least one embodiment.

Referring now to FIG. 9, a network 900 upon which the system(s) and method(s) may operate, is illustrated. As noted above, the system(s) and method(s) of the present patent application may be operational on one or more computer(s). The network 900 may include one or more client(s) 905 coupled to one or more client data store(s) 910. The one or more client(s) may be coupled through a communication network (e.g., fiber optics, telephone lines, wireless, etc.) to the communication framework 930. The communication framework 230 may be, for example, the Internet, and Intranet, a peer-to-peer network, a LAN, an ad hoc computer-to-computer network, etc. The network 900 may also include one or more server(s) 915 coupled to the communication framework 930 and coupled to a server data store(s) 920. The present invention system(s) and method(s) may also have portions that are operative on one or more of the components in the network 900 so as to operate as a complete operative system(s) and method(s).

While embodiments of the invention have been described above, it is evident that many alternatives, modifications and variations will be apparent to those skilled in the art. In general, embodiments may relate to the automation of these and other business processes in which analysis of data is performed. Accordingly, the embodiments of the invention, as set forth above, are intended to be illustrative, and should not be construed as limitations on the scope of the invention. Various changes may be made without departing from the spirit and scope of the invention. Accordingly, the scope of the present invention should be determined not by the embodiments illustrated above, but by the claims appended hereto and their legal equivalents All publications, patents, and patent applications cited herein are hereby incorporated by reference in their entirety for all purposes.

We claim:

1. A computer implemented method of data management, comprising the steps of:
   pre-selecting, at a processing unit, a portion of a plurality of windows of data in a data stream using a first content-defined selecting function that includes a boxcar sum function, an multiplicative linear congruential generator (MLCG) function, or a rolN-xor function; and
   selecting, at the processing unit, a subset of the portion of the plurality of windows pre-selected using a second content-defined selecting function to maximize a given characteristic,
   wherein the first content-defined selecting function is faster at selecting a data block boundary than is the second content-defined selecting function.

2. The method of claim 1, wherein the first content-defined selecting function is faster at window selection than is the second content-defined selecting function.

3. The method of claim 1, wherein the first content-defined selecting function is the boxcar sum function and the boxcar sum function is coupled with a selection criterion on the value of a boxcar sum.

4. The method of claim 1, wherein file second content-defined selecting function includes a Rabin fingerprint, a SHA-1 function, or a CRC32c function.

5. The method of claim 1, wherein the plurality of windows are utilized for defining data groups for hashing and speed of determining break points in the data stream is increased.

6. The method of claim 1, further comprising the step of:
   generating, at the processing unit, a value for a data chunk size of a data chunk determined by one or more chunk points of the subset, wherein the generated value is indicative of underlying data contained in the data chunk.

7. The method of claim 6, further comprising the step of:

comparing, at the processing unit, the generated value with one or more previously generated values to determine if the generated value equals the one or more previously generated values.

8. The method of claim 7, further comprising the steps of:
determining, at the processing unit, that there is data duplication present; and
halting further processing, at the processing unit, of the data in a data chunk determined to have duplicate data.

9. The method of claim 7, further comprising the step of:
storing, by the processing unit, the generated value if there is no data duplication.

10. The method of claim 1, further comprising the step of comparing, at the processing unit, underlying data contained in a new window of data or data chunk selected by the second content-defined selection function with previously encountered underlying data from previously defined window(s) of data or data chunk(s).

11. The method of claim 10, further comprising the steps of:
outputting, by the processing unit, the underlying data contained in the new window of data if the underlying data does not equal the previously encountered underlying data; and
not outputting the underlying data contained in the new data chunk if the underlying data does equal the previously encountered underlying data.

12. The method of claim 1, further comprising the step of generating, at the processing unit, a value for a window of data or data chunk indicative of underlying data contained in the window of data or data chunk.

13. The method of claim 12, further comprising the step of comparing, at the processing unit, the generated value with previously generated or encountered value(s).

14. The method of claim 13, further comprising the steps of:
outputting, by the processing unit, the generated value if the generated value does not equal the previously generated or encountered value(s); and
not outputting the generated value if the generated value does equal the previously generated or encountered value(s).

15. A computer implemented method of determining boundary points in a data stream for data management, comprising:
pre-selecting, at a processing unit, a portion of a plurality of boundary points in a data stream using a first content-defined selecting function that includes a boxcar sum function, an multiplicative linear congruential generator (MLCG) function, or a rolN-xor function;
selecting, at the processing unit, a subset of the portion of the plurality of boundary points pre-selected using a second content-defined selecting function to maximize a given characteristic; and
generating, at the processing unit, a value for a chunk of data as determined by the subset of the portion of the plurality of boundary points,
wherein the first content-defined selecting function is faster at selecting a boundary point than is the second content-defined selecting function.

16. The method of claim 15, further comprising the step of comparing, at the processing unit, the generated value with one or more stored value(s), so as to detect a duplicate or store the generated value.

17. The method of claim 16, wherein generating a value is performed by hashing.

18. The method of claim 17, further comprising the step of eliminating, at the processing unit, duplicate data found by hashing the data contained in a chunk of data defined by the boundary point(s).

19. A data processing system, comprising:
a processing unit;
a first content-defined selection function module configured to pre-select a first set of data break points or windows that includes a boxcar sum function, an multiplicative linear congruential generator (M.LCG) function, or a rolN-xor function; and
a second content-defined selection function module configured to select a subset of the pre-selected data break points or windows to maximize a given characteristic, wherein the first content-defined selection function module processes the data break points or windows faster than the second content-defined selection function module.

20. The data processing system of claim 19, wherein the first content-defined selection function module includes a boxcar sum function and the second content-defined selection function module includes a Rabin function.

21. The data processing system of claim 20, wherein the data processing system is a hashing system and outputs content-defined data block(s) or chunk point(s).

22. A data processing system, comprising:
means for pre-selecting a first set of data break points or windows using a content-defined pre-selecting function that includes a boxcar sum function, an multiplicative linear congruential generator (MLCG) function, or a rolN-xor function, comprising a processing unit; and
means for selecting and outputting a subset of the pre-selected data break points or windows using a content-defined selecting function to maximize a given characteristic, wherein the means for pre-selecting processes the data break points or windows faster than the means for selecting.

23. The data processing system of claim 22, further comprising means for generating a value for each of the data break point(s) or window(s) of the subset.

24. The data processing system of claim 23, wherein the means for pre-selecting a first set of data break points or windows performs a rolling boxcar sum function, the means for selecting and outputting a subset of the pre-selected data break points or windows performs a Rabin function, and the means for generating a value performs a SHA-1 function.

25. The data processing system of claim 24, wherein the generated value is a hash value.

26. The data processing system of claim 25, wherein the data processing system is a hashing system and outputs content-defined data block(s) or chunk point(s).

* * * * *